United States Patent
Nieslanik

(10) Patent No.: US 9,284,181 B1
(45) Date of Patent: Mar. 15, 2016

(54) QUICK RELEASE COUPLING FOR HORSE CONTROL GEAR

(71) Applicant: Tim Nieslanik, Carbondale, CO (US)

(72) Inventor: Tim Nieslanik, Carbondale, CO (US)

( * ) Notice: Subject to any disclaimer, the term of this patent is extended or adjusted under 35 U.S.C. 154(b) by 0 days.

(21) Appl. No.: 14/539,288

(22) Filed: Nov. 12, 2014

(51) Int. Cl.
  B68B 5/00 (2006.01)
  A01K 27/00 (2006.01)
  F16B 21/16 (2006.01)
  B68B 5/06 (2006.01)
  F16B 21/06 (2006.01)

(52) U.S. Cl.
  CPC .. *B68B 5/06* (2013.01); *F16B 21/06* (2013.01)

(58) Field of Classification Search
  CPC .............. B68B 1/04; B68B 1/06; B68B 5/00;
    A01K 27/005; F16B 7/042; F16B 45/04;
    F16B 21/165
  See application file for complete search history.

(56) References Cited

U.S. PATENT DOCUMENTS

| | | | |
|---|---|---|---|
| 1,282,141 A | 10/1918 | Thompson | |
| 3,413,692 A * | 12/1968 | Pressley | F16G 11/10 24/602 |
| 3,540,089 A * | 11/1970 | Willard | A01K 27/005 119/776 |
| 4,198,080 A * | 4/1980 | Carpenter | A61M 39/1011 24/635 |
| 4,277,934 A * | 7/1981 | Rieck | B68B 5/00 403/325 |
| 4,742,605 A | 5/1988 | Ritacco | |
| 5,103,771 A * | 4/1992 | Lee | F16G 11/10 119/776 |
| 6,308,662 B1 * | 10/2001 | Furman | A01K 27/005 119/772 |
| 6,349,527 B1 | 2/2002 | Keppick | |
| 6,449,930 B2 * | 9/2002 | Robart | B68B 1/06 54/8 |
| 6,457,896 B1 * | 10/2002 | deDoes | A01K 27/005 285/2 |
| 6,530,345 B2 * | 3/2003 | Donze | A01K 27/005 119/772 |
| 6,671,933 B1 * | 1/2004 | Friend | F16B 45/04 24/115 F |
| 7,389,750 B1 * | 6/2008 | Rogers | A01K 27/005 119/792 |
| 7,640,639 B2 * | 1/2010 | de Bien | A01K 27/005 119/772 |
| 2014/0143986 A1 * | 5/2014 | Genova | A01K 27/005 24/369 |

* cited by examiner

*Primary Examiner* — Robert J Sandy
*Assistant Examiner* — Rowland Do
(74) *Attorney, Agent, or Firm* — Crossley Patent Law

(57) ABSTRACT

A quick release coupling for horse control gear having a rein clip having a first shaft. A trigger snip clap is attached to a clip attachment portion of the rein clip. A male attachment piece is disposed upon a second end of the first shaft. A female attachment piece includes a second shaft. A swivel harness attachment, an inner ring, and an outer ring are each retained by the second shaft. The inner ring and the outer ring have a first inner cavity and a second inner cavity, respectively. The male attachment piece is configured to reversibly engage the first inner cavity. A plurality of ball bearings, and a plurality of torsion springs are retained within retention chambers. A notch is disposed upon an inner face of the outer ring.

10 Claims, 3 Drawing Sheets

QUICK RELEASE COUPLING FOR HORSE CONTROL GEAR

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of quick release couplings are known in the prior art. However, these quick release couplings are designed to make release of a male attachment piece from a female attachment piece possible only through a user applied force. These attachment pieces are not configured to become disengaged upon an action by an animal. A common problem in leading a horse is that the horse will inadvertently step on her reins or lead while walking. This will cause the horse's head to be jerked down towards the horse's feet, spooking the horse, and stressing the animal. Current couplings do not address this problem.

Thus, what is needed is a quick release coupling for horse control gear having a male attachment piece and a female attachment piece, the male attachment piece configured to automatically disengage the female attachment piece upon a pull of the control gear, such as a reins or lead. The female attachment piece is configured to retain the male attachment piece within an inner cavity, until a pull with sufficient force causes the male attachment piece to become disengaged from the female attachment piece. This pull can be triggered without any user action. Additionally, a user can disengage the coupling manually with less force than would be required by the horse, by sliding an outer ring across an inner ring until a notch aligns with a plurality of ball bearings. This alignment decreases the force necessary to disengage the male attachment piece from the female attachment piece.

FIELD OF THE INVENTION

The present invention relates to a quick release coupling, and more particularly, to a quick release coupling for horse control gear.

SUMMARY OF THE INVENTION

The general purpose of the present quick release coupling for horse control gear, described subsequently in greater detail, is to provide a quick release coupling for horse control gear which has many novel features that result in a quick release coupling for horse control gear which is not anticipated, rendered obvious, suggested, or even implied by prior art, either alone or in combination thereof.

The device includes a rein clip having a first shaft. The first shaft has a first end and a second end. A clip attachment portion is disposed upon the first end, while a trigger snap clip is disposed upon the clip attachment portion. The clip attachment portion serves to enhance the strength of the connection between the trigger snap clip and the first shaft by providing a larger surface upon which the trigger snap clip attaches to the first shaft.

A male attachment piece is disposed upon the second end of the first shaft. The male attachment piece has a tapered buttress, a disc-shaped engagement portion, and a cylindrical terminal end. A disc shaped stop cap is disposed upon the first shaft between the clip attachment portion and the male attachment piece.

The device also includes a female attachment piece. The female attachment piece includes a second shaft, a swivel harness attachment, a cylindrical shaped inner ring, and a cylindrical shaped outer ring. The second shaft has a disc shaped first terminal end and a disc shaped second terminal end.

The swivel harness attachment has a torus connection piece and a rounded-rectangular shaped rein ring. The torus connection piece includes a first aperture, wherein the second shaft is disposed within the first aperture. The torus connection piece is disposed between the first terminal end and the second terminal end of the second shaft.

The inner ring has a continuous cylindrical first side wall, a bottom retainer portion, and an upper lip. Each of the first side wall and the bottom retainer portion define a first inner cavity. The stop cap has a diameter greater than the first inner cavity and is configured to enclose the inner cavity preventing dust and debris from inadvertently getting into the inner cavity and degrading functionality. The engagement portion of the male attachment piece has a diameter less than the diameter of the inner cavity and is configured to slidingly engage the inner cavity.

A second aperture is medially disposed upon the bottom retainer portion. The second shaft is disposed within the second aperture. The bottom retainer portion is disposed proximal the first terminal end relative the torus connection piece and is disposed between the first terminal end and the second terminal end of the second shaft. The upper lip is configured to prevent the outer ring from becoming disengaged from the female attachment piece.

The outer ring has a second side wall and a lower lip. The second side wall includes an inner face, and an outer face. The lower lip is disposed perpendicular to each of the inner face and the outer face. Each of the inner face and the lower lip defining a second inner cavity. Both of the first side wall and the bottom retainer portion of the inner ring are disposed within the second inner cavity. A third aperture is disposed upon the lower lip, and the second shaft is disposed within the third aperture. Additionally, the third aperture is disposed between the first aperture and the second aperture.

A plurality of cylindrically shaped retention chambers are disposed within the first side wall. Each retention chamber has both a top opening and a bottom opening. A diameter of the top opening is less than a diameter of the bottom opening. The device includes a plurality of torsion springs, wherein, one of the plurality of torsion springs is disposed within each of the respective retention chambers. Each of the respective torsion springs is slidingly engaged with the inner face. The device further includes a plurality of ball bearings, wherein, one of the plurality of ball bearings is disposed within each of the respective retention chambers proximal the top opening. Each of the respective torsion springs is disposed between one of the plurality of ball bearings and the inner face of the outer ring. A diameter of each of the respective ball bearings is less than the diameter of the top opening. Each of the respective ball bearings is retained between one of the respective top openings and one of the respective torsion springs, while a protruding portion of each of the respective ball bearings extends through the top opening into the first inner cavity. A notch is continuously disposed upon the inner face. Upon alignment of the notch with each of the respective torsion springs a pressure of the torsion springs upon the respective ball bearings is decreased. It is envisioned that additional ball bearings could be disposed between each respective torsion spring and the inner face of the outer ring to decrease friction between the outer ring and each of the torsion springs and inner ring, respectively.

The outer face includes a plurality of gripping portions continuously disposed around the outer face. Further, a horse control gear body, such as a horse rein or lead, is removably engaged with the rein ring. Wherein, each of the swivel harness attachment, the inner ring, and the outer ring are configured to swivel around the second shaft.

In operation, a user mechanically clips the trigger snap clip to a horse bridle bit. The user will slidingly engage the male attachment piece into the first inner cavity of the female attachment piece. Engagement of the engagement portion of the male attachment piece with the first inner cavity causes the engagement portion to push the protruding portion of each of the respective ball bearings. This causes the ball bearings to retract into the retention chambers compressing the torsion springs. The male attachment piece will penetrate the first inner cavity past each of the ball bearings until the tapered buttress rests in contact with the protruding portion of each of the ball bearings. The horse control gear body is removably engaged with the rein ring. When a horse accidentally steps on his horse control gear body, the horse control gear body will pull against the horse bridle bit. When the pull is strong enough the tapered buttress and the engagement portion of the male attachment piece will push each of the ball bearings into the retention chambers triggering a disengagement of the male attachment piece from the female attachment piece. If the user wishes to manually disengage the male attachment piece from the female attachment piece without having to create a pull as hard as the horse would have to create to disengage the male attachment piece from the female attachment piece, the user can simply slide the outer ring until the notch is aligned with each of the torsion springs. This will cause the pressure from torsion springs upon the ball bearings to decrease, making it easier for the ball bearings to retract into the retention chambers, and thus, making it easier to disengage the male attachment piece from the female attachment piece.

Thus has been broadly outlined the more important features of the present quick release coupling for horse control gear so that the detailed description thereof that follows may be better understood and in order that the present contribution to the art may be better appreciated.

Numerous objects, features and advantages of the present quick release coupling for horse control gear will be readily apparent to those of ordinary skill in the art upon reading the following detailed description of presently preferred, but nonetheless illustrative, examples of the present quick release coupling for horse control gear when taken in conjunction with the accompanying drawings.

BRIEF DESCRIPTION OF THE DRAWINGS

Figures

DETAILED DESCRIPTION OF THE DRAWINGS

Figure 1:
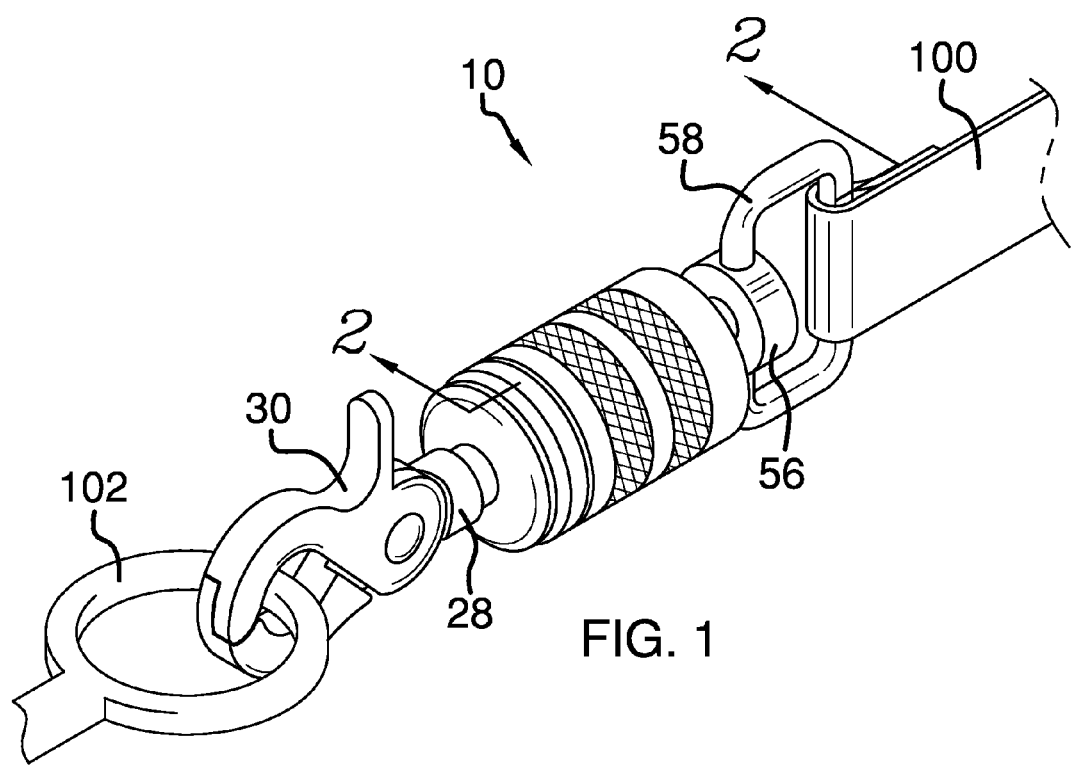
FIG. 1 is an isometric in-use view.
Figure 2:
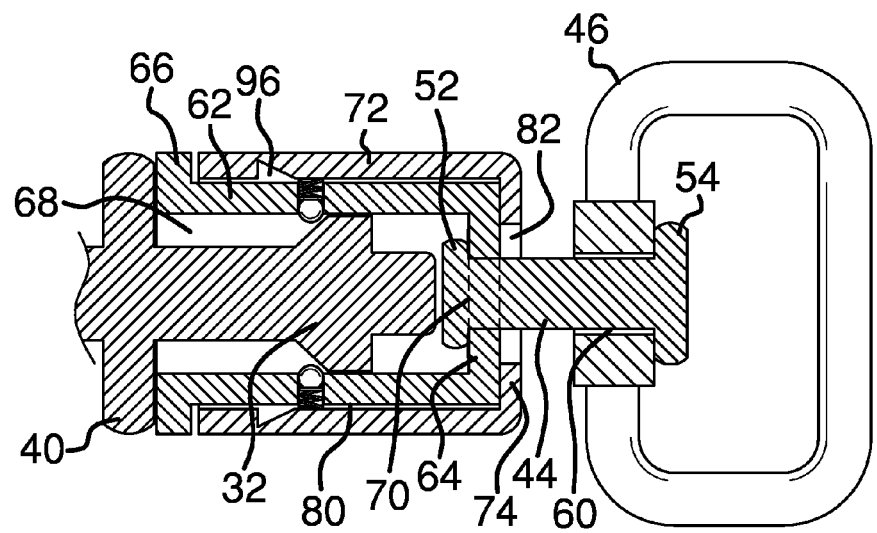
FIG. 2 is a side cross-sectional view.
Figure 3:
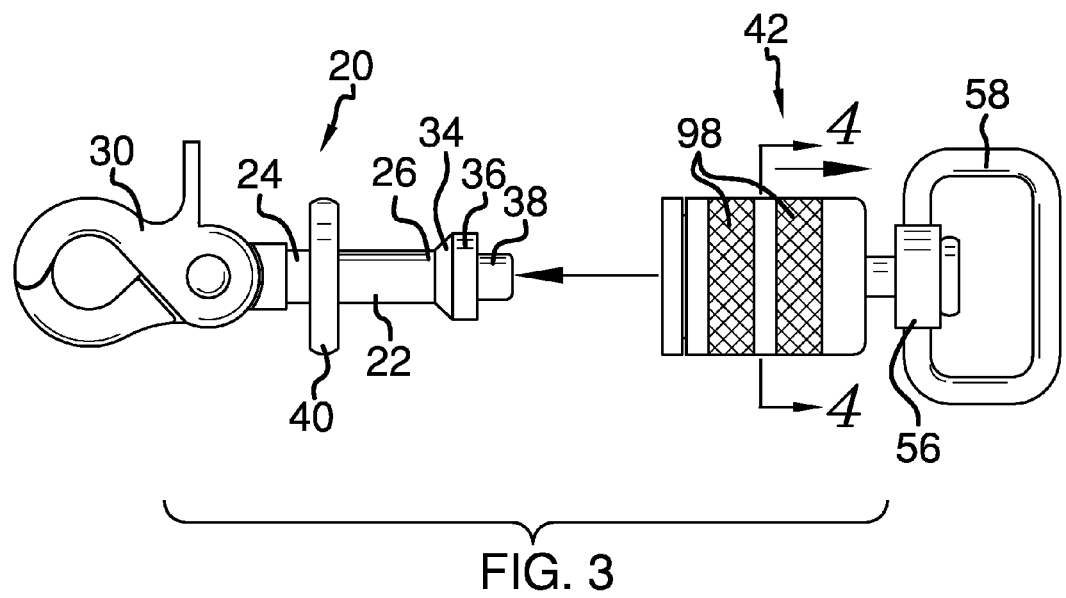
FIG. 3 is an exploded side view.
Figure 4:
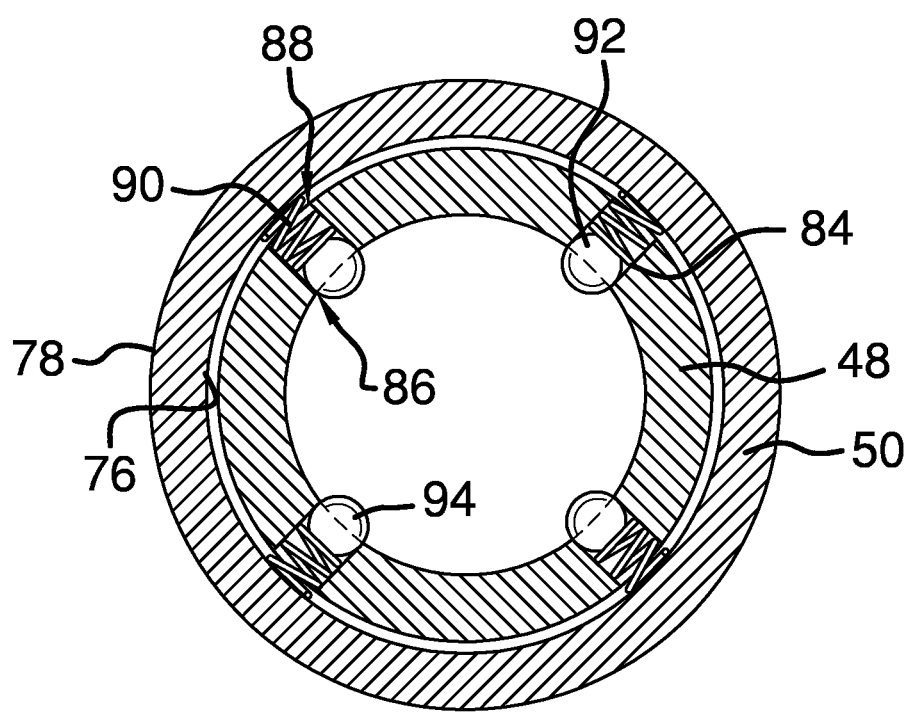
FIG. 4 is a front cross-sectional view.

With reference now to the drawings, and in particular FIGS. 1 through 4 thereof, the instant quick release coupling for horse control gear employing the principles and concepts of the present quick release coupling for horse control gear and generally designated by the reference number 10 will be described.

Referring to FIGS. 1 through 4 a preferred embodiment of the present quick release coupling for horse control gear 10 is illustrated. The device 10 includes a rein clip 20 having a first shaft 22. The first shaft 22 has a first end 24 and a second end 26. A clip attachment portion 28 is disposed upon the first end 24, while a trigger snap clip 30 is disposed upon the clip attachment portion 28. The clip attachment portion 28 serves to enhance the strength of the connection between the trigger snap clip 30 and the first shaft 22 by providing a larger surface upon which the trigger snap clip 30 attaches to the first shaft 22.

A male attachment piece 32 is disposed upon the second end 26 of the first shaft 22. The male attachment piece 32 has a tapered buttress 34, a disc-shaped engagement portion 36, and a cylindrical terminal end 38. A disc shaped stop cap 40 is disposed upon the first shaft 22 between the clip attachment portion 28 and the male attachment piece 32.

The device 10 also includes a female attachment piece 42. The female attachment piece 42 includes a second shaft 44, a swivel harness attachment 46, a cylindrical shaped inner ring 48, and a cylindrical shaped outer ring 50. The second shaft 44 has a disc shaped first terminal end 52 and a disc shaped second terminal end 54.

The swivel harness attachment 46 has a torus connection piece 56 and a rounded-rectangular shaped rein ring 58. The torus connection piece 56 includes a first aperture 60, wherein the second shaft 44 is disposed within the first aperture 60. The torus connection piece 56 is disposed between the first terminal end 52 and the second terminal end of the second shaft 54.

The inner ring 48 has a continuous cylindrical first side wall 62, a bottom retainer portion 64, and an upper lip 66. Each of the first side wall 62 and the bottom retainer portion 64 define a first inner cavity 68. The stop cap 40 has a diameter greater than the first inner cavity 68 and is configured to enclose the inner cavity 68 preventing dust and debris from inadvertently getting into the inner cavity 68 and degrading functionality. The engagement portion 36 of the male attachment piece 32 has a diameter less than the diameter of the inner cavity 68 and is configured to slidingly engage the inner cavity 68.

A second aperture 70 is medially disposed upon the bottom retainer portion 64. The second shaft 44 is disposed within the second aperture 70. The bottom retainer portion 64 is disposed proximal the first terminal end 52 relative the torus connection piece 56 and is disposed between the first terminal end 52 and the second terminal end 54 of the second shaft 44. The upper lip 66 is configured to prevent the outer ring 50 from becoming disengaged from the female attachment piece 42.

The outer ring 50 has a second side wall 72 and a lower lip 74. The second side wall 72 includes an inner face 76, and an outer face 78. The lower lip 74 is disposed perpendicular to each of the inner face 76 and the outer face 78. Each of the inner face 76 and the lower lip 74 defining a second inner cavity 80. Both of the first side wall 62 and the bottom retainer portion 64 of the inner ring 48 are disposed within the second inner cavity 80. A third aperture 82 is disposed upon the lower lip 74, and the second shaft 44 is disposed within the third aperture 82. Additionally, the third aperture 82 is disposed between the first aperture 60 and the second aperture 70.

A plurality of cylindrically shaped retention chambers 84 are disposed within the first side wall 62. Each retention chamber 84 has both a top opening 86 and a bottom opening 88. A diameter of the top opening 86 is less than a diameter of the bottom opening 88. The device 10 includes a plurality of torsion springs 90, wherein, one of the plurality of torsion springs 90 is disposed within each of the respective retention chambers 84. Each of the respective torsion springs 90 is slidingly engaged with the inner face 76. The device 10 further includes a plurality of ball bearings 92, wherein, one of the plurality of ball bearings 92 is disposed within each of the respective retention chambers 84 proximal the top opening 86. Each of the respective torsion springs 90 is disposed between one of the plurality of ball bearings 92 and the inner face 76 of the outer ring 50. A diameter of each of the respective ball bearings 92 is less than the diameter of the top opening 86. Each of the respective ball bearings 92 is retained between one of the respective top openings 86 and one of the respective torsion springs 90, while a protruding portion 94 of each of the respective ball bearings 92 extends through the top opening into the first inner cavity 68. A notch 96 is continuously disposed upon the inner face 76. Upon alignment of the notch 96 with each of the respective torsion springs 90 a pressure of the torsion springs 90 upon the respective ball bearings 92 is decreased, making it easier to disengage the male attachment piece 32 from the first inner ring 48 than if the notch 96 had not been aligned with the torsion springs 90.

The outer face 78 includes a plurality of gripping portions 98 continuously disposed around the outer face 78. Further, a horse control gear body 100, including a horse rein or a lead, is removably engaged with the rein ring 58. Wherein, each of the swivel harness attachment 46, the inner ring 48, and the outer ring 50 are configured to swivel around the second shaft 44.

In operation, a user mechanically clips the trigger snap clip 30 to a horse bridle bit 102. The user will slidingly engage the male attachment piece 32 into the first inner cavity 68 of the female attachment piece 42. Engagement of the engagement portion 36 of the male attachment piece 32 with the first inner cavity 68 causes the engagement portion 36 to push the protruding portion 94 of each of the respective ball bearings 92. This causes the ball bearings 92 to retract into the retention chambers 84 compressing the torsion springs 90. The male attachment piece 32 will penetrate the first inner cavity 68 past each of the ball bearings 92 until the tapered buttress 34 rests in contact with the protruding portion 94 of each of the ball bearings 92, and is retained within the first inner cavity 68. The horse control gear body 100, which can be a rein or lead, is removably engaged with the rein ring 58. When a horse accidentally steps on his horse control gear body 100, the horse control gear body 100 will pull against the horse bridle bit 102. When the pull is strong enough, the tapered buttress 34 and the engagement portion 36 of the male attachment piece 32 will push each of the ball bearings 92 into the retention chambers 84 triggering a disengagement of the male attachment piece 32 from the female attachment piece 42. If the user wishes to manually disengage the male attachment piece 32 from the female attachment piece 42 without having to create a pull as hard as the horse would have to create to disengage the male attachment piece 32 from the female attachment piece 42, the user can simply slide the outer ring 50 until the notch 96 is aligned with each of the torsion springs 90. This will cause the pressure from torsion springs 90 upon the ball bearings 92 to decrease, making it easier for the ball bearings 92 to retract into the retention chambers 84, and thus, making it easier to disengage the male attachment piece 32 from the female attachment piece 42.

What is claimed is:

1. A quick release coupling for horse control gear comprising:
    a rein clip having a first shaft, the first shaft having a first end and a second end;
    a clip attachment portion disposed upon the first end;
    a snap clip disposed upon the clip attachment portion;
    a male attachment piece disposed upon the second end of the first shaft;
    a female attachment piece, the female attachment piece including a second shaft, a swivel harness attachment, a cylindrical shaped inner ring, and a cylindrical shaped outer ring;
    the second shaft having a first terminal end and a second terminal end;
    the swivel harness attachment having a torus connection piece, and a rounded-rectangular shaped rein ring, the torus connection piece having a first aperture, the second shaft disposed within the first aperture, the torus connection piece disposed between the first terminal end and the second terminal end of the second shaft;
    the inner ring having a continuous cylindrical first side wall, a bottom retainer portion, and an upper lip, each of the first side wall and the bottom retainer portion defining a first inner cavity, a second aperture medially disposed upon the bottom retainer portion, the second shaft disposed within the second aperture, the bottom retainer portion disposed proximal the first terminal end relative the torus connection piece, the bottom retainer portion disposed between the first terminal end and the second terminal end of the second shaft; and
    the outer ring having a second side wall and a lower lip, the second side wall having an inner face, an outer face, the lower lip perpendicular to each of the inner face and the outer face, each of the inner face and the lower lip defining a second inner cavity, each of the first side wall and the bottom retainer portion of the inner ring disposed within the second inner cavity, a third aperture disposed upon the lower lip, the second shaft disposed within the third aperture, the third aperture disposed between the first aperture and the second aperture;
    wherein the male attachment piece is configured to reversibly engage the first inner cavity; and
    wherein the male attachment piece is configured to disengage from the first inner cavity upon a force.

2. The quick release coupling for horse control gear of claim 1 further comprising:
    a plurality of cylindrically shaped retention chambers disposed within the first side wall, each retention chamber having a top opening and a bottom opening, a diameter of the top opening being less than a diameter of the bottom opening;
    a plurality of torsion springs, one of the plurality of torsion springs disposed within each of the respective retention chambers, each of the respective torsion springs slidingly engaged with the inner face; and
    a plurality of ball bearings, one of the plurality of ball bearings disposed within each of the respective retention chambers proximal the top opening, each of the respective torsion springs disposed between one of the plurality of ball bearings, and the inner face of the outer ring, a diameter of each of the respective ball bearings being less than the diameter of the top opening, each of the respective ball bearings retained between one of the respective top openings and one of the respective torsion springs, a protruding portion of each of the respective ball bearings extending through the top opening into the first inner cavity;

wherein the male attachment piece includes a tapered buttress, a disc-shaped engagement portion, and a cylindrical terminal end;

wherein the engagement portion of the male attachment piece has a diameter less than the diameter of the inner cavity, the engagement portion configured to slidingly engage the inner cavity pressing each of the respective ball bearings against one of the respective torsion springs; and wherein upon alignment of the notch with each of the respective torsion springs a pressure of the torsion spring upon one of the respective ball bearings is decreased.

3. The quick release coupling for horse control gear of claim 2 further comprising:
a notch continuously disposed upon the inner face.

4. The quick release coupling for horse control gear of claim 3 further comprising:
a disc shaped stop cap is disposed upon the first shaft between the clip attachment portion and the male attachment piece;
wherein the stop cap has a diameter greater than the first inner cavity and is configured to enclose the inner cavity.

5. The quick release coupling for horse control gear of claim 4 wherein each of the first terminal end and the second terminal end are each disc shaped.

6. The quick release coupling for horse control gear of claim 5 wherein each of the swivel harness attachment, the cylindrical shaped inner ring, and the cylindrical shaped outer ring configured to swivel around the second shaft.

7. The quick release coupling for horse control gear of claim 6 wherein the snap clip is a trigger snap clip.

8. The quick release coupling for horse control gear of claim 7 further comprising:
a plurality of gripping portions disposed upon the outer face.

9. The quick release coupling for horse control gear of claim 8 further comprising:
a horse control gear body removably engaged with the rein ring.

10. A quick release coupling for horse control gear comprising:
a rein clip having a first shaft, the first shaft having a first end and a second end;
a clip attachment portion disposed upon the first end;
a trigger snap clip disposed upon the clip attachment portion;
a male attachment piece disposed upon the second end of the first shaft, the male attachment piece having a tapered buttress, a disc-shaped engagement portion, and a cylindrical terminal end;
a disc shaped stop cap is disposed upon the first shaft between the clip attachment portion and the male attachment piece;
a female attachment piece, the female attachment piece including a second shaft, a swivel harness attachment, a cylindrical shaped inner ring, and a cylindrical shaped outer ring;
the second shaft having a disc shaped first terminal end and a disc shaped second terminal end;
the swivel harness attachment having a torus connection piece, and a rounded-rectangular shaped rein ring, the torus connection piece having a first aperture, the second shaft disposed within the first aperture, the torus connection piece disposed between the first terminal end and the second terminal end of the second shaft;
the inner ring having a continuous cylindrical first side wall, a bottom retainer portion, and an upper lip, each of the first side wall and the bottom retainer portion defining a first inner cavity, a second aperture medially disposed upon the bottom retainer portion, the second shaft disposed within the second aperture, the bottom retainer portion disposed proximal the first terminal end relative the torus connection piece, the bottom retainer portion disposed between the first terminal end and the second terminal end of the second shaft;
the outer ring having a second side wall and a lower lip, the second side wall having an inner face, an outer face, the lower lip perpendicular to each of the inner face and the outer face, each of the inner face and the lower lip defining a second inner cavity, each of the first side wall and the bottom retainer portion of the inner ring disposed within the second inner cavity, a third aperture disposed upon the lower lip, the second shaft disposed within the third aperture, the third aperture disposed between the first aperture and the second aperture, a notch continuously disposed upon the inner face;
a plurality of cylindrically shaped retention chambers disposed within the first side wall, each retention chamber having a top opening and a bottom opening, a diameter of the top opening being less than a diameter of the bottom opening;
a plurality of torsion springs, one of the plurality of torsion springs disposed within each of the respective retention chambers, each of the respective torsion springs slidingly engaged with the inner face;
a plurality of ball bearings, one of the plurality of ball bearings disposed within each of the respective retention chambers proximal the top opening, each of the respective torsion springs disposed between one of the plurality of ball bearings, and the inner face of the outer ring, a diameter of each of the respective ball bearings being less than the diameter of the top opening, each of the respective ball bearings retained between one of the respective top openings and one of the respective torsion springs, a protruding portion of each of the respective ball bearings extending through the top opening into the first inner cavity;
a plurality of gripping portions disposed upon the outer face; and
a horse control gear body removably engaged with the rein ring;
wherein the stop cap has a diameter greater than the first inner cavity and is configured to enclose the inner cavity, the engagement portion of the male attachment piece having a diameter less than the diameter of the inner cavity, the engagement portion configured to slidingly engage the inner cavity, each of the swivel harness attachment, the inner ring, and the outer ring configured to swivel around the second shaft;
and wherein upon alignment of the notch with each of the respective torsion springs a pressure of the torsion springs upon the respective ball bearings is decreased.

* * * * *